US012771256B2

(12) United States Patent
Wang et al.

(10) Patent No.: US 12,771,256 B2
(45) Date of Patent: Oct. 20, 2026

(54) DIRECT POWER AC/DC CONVERTER

(71) Applicant: Huawei Digital Power Technologies Co., Ltd., Shenzhen (CN)

(72) Inventors: Luyu Wang, Kista (SE); Xiao Zhang, Xi'an (CN); Shuyu Ou, Kista (SE); Wenbo Sun, Dongguan (CN); Grover Victor Torrico-Bascopé, Kista (SE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 300 days.

(21) Appl. No.: 18/448,298

(22) Filed: Aug. 11, 2023

(65) Prior Publication Data

US 2023/0387814 A1 Nov. 30, 2023

Related U.S. Application Data

(63) Continuation of application No. PCT/EP2021/053395, filed on Feb. 12, 2021.

(51) Int. Cl.
*H02M 3/335* (2006.01)
*H02M 1/00* (2007.01)
(Continued)

(52) U.S. Cl.
CPC ..... *H02M 3/33573* (2021.05); *H02M 1/0058* (2021.05); *H02M 1/088* (2013.01); *H02M 3/01* (2021.05)

(58) Field of Classification Search
CPC .... H02M 1/007; H02M 1/0048; H02M 1/088; H02M 1/0058; H02M 3/33573;
(Continued)

(56) References Cited

U.S. PATENT DOCUMENTS 5,959,850 A 9/1999 Lim
7,099,161 B2 * 8/2006 Yan .................. H02M 3/33592 363/17

(Continued)

FOREIGN PATENT DOCUMENTS

| | | | | |
|---|---|---|---|---|
| GB | 2452318 A | * | 3/2009 | ........ H02M 3/33571 |
| GB | 2524102 A | * | 9/2015 | .......... H02M 1/4241 |
| WO | WO-2019199964 A1 | * | 10/2019 | .............. B60L 53/14 |

OTHER PUBLICATIONS

GB-2452318-A text (Year: 2009).*

(Continued)

*Primary Examiner* — Thienvu V Tran
*Assistant Examiner* — Yahveh Comas Torres
(74) *Attorney, Agent, or Firm* — Maier & Maier, PLLC

(57) ABSTRACT

A direct power AC/DC conversion apparatus employs a dual branch topology. A first branch includes a first AHB switching network configured to receive an AC grid power and produce an AC power, coupled through a series resonant impedance to a first primary winding of a transformer. The first switching network includes two bi-directional switches coupled in series where each bi-directional switch includes two switching devices coupled in series in opposite polarity. A secondary winding of the transformer is coupled through an SR switching device to an output DC power. A second branch includes a diode bridge, configured to receive the AC grid power and produce a DC power, coupled to a second AHB switching network. The second AHB switching network is coupled through a second series resonant impedance to a second primary winding of the transformer. Each of the first and second branches are operated alternately and independently.

13 Claims, 13 Drawing Sheets

(51) Int. Cl.
*H02M 1/088* (2006.01)
*H02M 3/00* (2006.01)

(58) Field of Classification Search
CPC .. H02M 3/33571; H02M 3/01; H02M 7/4815; H02M 7/06; H02M 7/4807; H02M 5/2932; H02M 1/0067; Y02B 70/10
See application file for complete search history.

(56) References Cited

U.S. PATENT DOCUMENTS

| | | | | |
|---|---|---|---|---|
| 8,619,438 | B2 * | 12/2013 | Wang | H02M 3/33571 363/21.02 |
| 9,899,929 | B2 * | 2/2018 | Jitaru | H02M 3/33592 |
| 10,050,545 | B2 * | 8/2018 | Jitaru | H02M 3/3353 |
| 10,170,974 | B1 * | 1/2019 | Oh | H02M 1/32 |
| 10,574,148 | B1 * | 2/2020 | Jitaru | H02M 3/33573 |
| 10,594,225 | B1 * | 3/2020 | Lin | H02M 3/285 |
| 10,651,748 | B2 * | 5/2020 | Jitaru | H02M 3/33592 |
| 10,972,011 | B2 * | 4/2021 | Wilkinson | H02M 3/33571 |
| 11,139,734 | B2 * | 10/2021 | Abramovici | H02M 3/33571 |
| 11,277,073 | B2 * | 3/2022 | Jitaru | H01F 38/42 |
| 11,411,489 | B2 * | 8/2022 | Yang | H02M 1/083 |
| 11,482,934 | B2 * | 10/2022 | Wilkinson | H02M 3/33571 |
| 11,491,883 | B2 * | 11/2022 | Khaligh | H02M 7/797 |
| 11,606,026 | B2 * | 3/2023 | Jang | H04N 5/63 |
| 2009/0303753 | A1 * | 12/2009 | Fu | H02M 3/01 363/20 |
| 2012/0007512 | A1 * | 1/2012 | Kim | H05B 45/40 315/152 |
| 2015/0015071 | A1 * | 1/2015 | Deboy | H02M 3/33592 307/31 |
| 2017/0133940 | A1 * | 5/2017 | Wilkinson | H02M 3/337 |
| 2018/0309372 | A1 * | 10/2018 | Leong | H02M 1/44 |
| 2020/0083818 | A1 * | 3/2020 | Lin | H02M 3/285 |
| 2021/0057989 | A1 * | 2/2021 | Jang | H02M 1/4225 |
| 2022/0286061 | A1 * | 9/2022 | Hayashi | H02M 3/158 |

OTHER PUBLICATIONS

GB_2524102 Text (Year: 2015).*

Chiu et al., “A Single-Stage Soft-Switching Flyback Converter for Power-Factor-Correction Applications”, IEEE Transactions on Industrial Electronics, ResearchGate, IEEE, Jun. 2010, vol. 57, No. 6, 5 pages.

Huynh et al., “Performance Analysis of a Single-Stage High-Frequency AC-AC Buck Converter for a Series-Series Compensated Inductive Power Transfer System”, 2018 IEEE Transportation Electrification Conference and Expo (ITEC), IEEE, XP033393591, Jun. 13, 2018, 6 pages.

Choi et al., “A Novel Single-Stage AC-DC Converter to Supply Sustain Power for Plasma Display Panels”, Journal of Display Technology, IEEE, Sep. 2011, vol. 7, No. 9, 9 pages.

Huynh, “Soft-Switched, Active-Clamped DC/AC and AC/AC Converters for IPT-Based Wireless Charging Applications”, Postdoctoral Thesis, Department of Electrical, Computer and Software Engineering, University of Ontario Institute of Technology, Sep. 1, 2020, 216 pages.

IEC 61000-3-2, “Electromagnetic Compatibility (EMC)—Part 3-2: Limits—Limits for Harmonic Current Emissions (Equipment Input Current ≤ 16 A per phase)”, International Standard, International Electrotechnical Commission (IEC), Jan. 2018, Edition 5.0, 78 pages.

* cited by examiner

DIRECT POWER AC/DC CONVERTER

CROSS-REFERENCE TO RELATED APPLICATIONS

This application is a continuation of International Application No. PCT/EP2021/053395, filed on Feb. 12, 2021, the disclosure of which is hereby incorporated by reference in its entirety.

TECHNICAL FIELD

The aspects of the embodiments relate to power conversion apparatus and resonant AC-DC power converters.

BACKGROUND

Processing power and screen sizes in modern mobile devices are continually increasing leading to increased power consumption and corresponding increases in battery size. Unfortunately, with conventional battery chargers these larger batteries require undesirably long charging times. Premium cell phones currently come with chargers in the range 40 to 65 Watts. Multi-function chargers, which may charge cell phones, laptops, and other types of devices, may provide 75 Watts or more of charging power. Regulatory requirements, such as regulations imposed by some jurisdictions on chargers delivering more than 75 Watts, add complexity, cost and can lower overall efficiency of higher power chargers.

Current shaping techniques have been combined with ACF topologies to reduce component count and system cost. However, in these topologies energy is processed twice yielding unacceptably low system efficiency. Combining bridgeless techniques with active half bridge (AHB) topologies improves system efficiency, but still processes the energy twice thereby limiting system efficiency.

An AHB flyback converter can provide high efficiency with low component stresses and shows potential for high power density. However, these techniques are limited to lower power, such as applications using less than 75 Watts.

Thus, there is a need for improved high output AC/DC power converters that can provide high efficiency and high-power density while meeting applicable regulatory requirements. Accordingly, it would be desirable to provide an apparatus that addresses at least some of the problems described above.

SUMMARY

The aspects of the embodiments are directed to a direct power AC/DC conversion apparatus employing a dual branch topology to provide high system efficiency and high-power density in a converter capable of delivering high output power over a wide range of input power and wide range of output power (WIWO) operating conditions. The aspects of the embodiments provide WIWO power conversion while converting a majority of the energy only once.

According to a first aspect, the above and further objectives and advantages are obtained by an apparatus. In one embodiment, the apparatus includes a transformer including a first primary winding magnetically coupled to a secondary winding, and a first series resonant impedance which includes a first resonant inductor, a first resonant capacitor, and the first primary winding connected in series. The apparatus further includes a first switching network connected between a first AC power node and a second AC power node. The first switching network includes a first bi-directional switch connected in series with a second bi-directional switch, where the first series resonant impedance is connected in parallel with the second bi-directional switch. The apparatus further includes a rectifier switch connected between a first end of the secondary winding and a first DC node, where a second end of the secondary winding is connected to a second DC node. The first bi-directional switch includes a first switching device connected in series with a second switching device where a source of the first switching device is connected to a source of the second switching device. The second bi-directional switch includes a third switching device connected in series with a fourth switching device where a source of the third switching device is connected to a source of the fourth switching device. The resonant DC-DC converter provides efficient single stage power conversion, while the bi-directional switches provide the ability to deactivate the switching network thereby allowing the converter to be disabled and stop power flow through the converter.

In a possible implementation form of the apparatus, the apparatus further includes a second primary winding magnetically coupled to the secondary winding, and a second series resonant impedance including a second resonant inductor, a second resonant capacitor, and the second primary winding connected in series. The apparatus includes a diode bridge connected between the first AC power node and the second AC power node and configured to produce a first DC power. A second switching network is connected in parallel with the first DC power, where the second switching network includes a fifth switching device connected in series with a sixth switching device. The second series resonant impedance is connected in parallel with the sixth switching device. Including a second converter branch allows for efficient power conversion over a wider range of AC voltage.

In a possible implementation form of the apparatus, an AC voltage is connected across the first AC power node and the second AC power node. When a magnitude of the AC voltage is greater than a predetermined voltage threshold, the fifth switching device and the sixth switching device are turned off and the first bidirectional switch and the second bidirectional switch are operated to transfer power from the AC voltage to the first DC node and the second DC node. When the magnitude of the AC voltage is not greater than the predetermined voltage threshold, the first bidirectional switch and the second bidirectional switch are turned off, and the fifth switching device and the sixth switching device are operated to transfer power from the AC voltage to the first DC node and the second DC node. Selectively enabling the first converter branch when the input voltage is greater than the voltage threshold and enabling the second converter branch otherwise improves converter efficiency by enabling the most efficient branch as the AC voltage changes.

In a possible implementation form of the apparatus, the predetermined voltage threshold is greater than a DC output voltage times the turn ratio between the first primary winding and the secondary winding. Setting the voltage threshold greater than the DC output voltage times the turn ratio, selects the more efficient single stage branch while operating in buck mode and selects the second branch otherwise.

In a possible implementation form of the apparatus, the first series resonant impedance is connected in parallel with the first bi-directional switch. This circuit configuration is an equivalent alternative to the preceding configuration.

In a possible implementation form of the apparatus, the second series resonant impedance is connected in parallel with the fifth switching device. This circuit configuration is an equivalent alternative to the preceding configuration.

In a possible implementation form of the apparatus, the first DC node is the positive DC node and the second DC node is the negative DC node. This circuit configuration is an equivalent alternative to the preceding configuration.

In a possible implementation form of the apparatus, the first DC node is the negative DC node and the second DC node is the positive DC node. This circuit configuration is an equivalent alternative to the preceding configuration.

In a possible implementation form of the apparatus, a bus capacitor is connected in parallel with the second switching network. Including a bus capacitor improves efficiency of the second branch of the converter.

In a possible implementation form of the apparatus, an output capacitor is connected across the first DC node and the second DC node. Including an output capacitor provides advantageous filtering of the output power.

These and other aspects, implementation forms, and advantages of the exemplary embodiments will become apparent from the embodiments described herein considered in conjunction with the accompanying drawings. It is to be understood, however, that the description and drawings may be for purposes of illustration and not as a definition of the limits of the embodiments. Additional aspects and advantages of the embodiments will be set forth in the description that follows, and in part will be clear from the description, or may be learned or understood by practice of the embodiments.

BRIEF DESCRIPTION OF THE DRAWINGS

The embodiments will be explained in more detail with reference to the drawings, in which like references indicate like elements and.

DETAILED DESCRIPTION OF THE EMBODIMENTS

Figure 1:
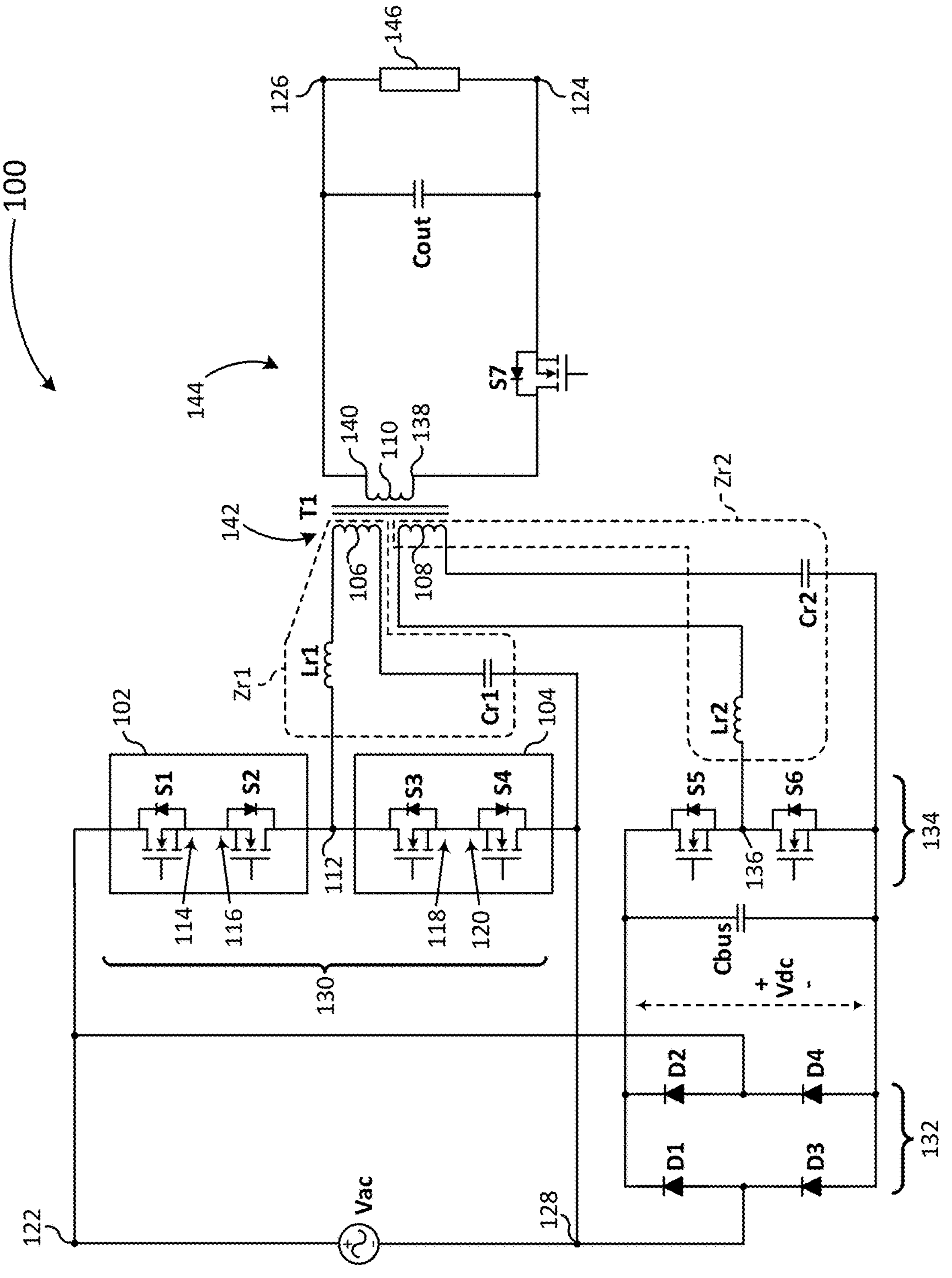
FIG. 1 illustrates a schematic diagram of an exemplary direct power AC/DC converter apparatus incorporating aspects of the embodiments.

Referring to FIG. 1, a schematic diagram of a power conversion apparatus 100 is illustrated. The apparatus 100 of the embodiments is directed to a direct power AC/DC conversion apparatus employing a dual branch topology to provide high system efficiency and high-power density in a converter capable of delivering high output power, such as output power above 75 Watts. The apparatus 100 is appropriate for use as a charging apparatus for mobile devices, laptops, and other battery-operated devices that can benefit from an efficient and small charger capable of delivering high output power while operating over wide input and wide output (WIWO) range.

In the drawings, connections, or lines, in a circuit diagram that cross without a dot 150 are not connected and connections of lines that cross or intersect with a dot 152 are connected.

Referring to FIG. 1, in one embodiment the apparatus 100 includes a transformer T1 including a first primary winding 106 magnetically coupled to a secondary winding 110. A first series resonant impedance Zr1 includes a first resonant inductor Lr1, a first resonant capacitor Cr1, and the first primary winding 106, connected in series.

A first switching network 130 is connected between a first AC power node 122 and a second AC power node 128. In the illustrated embodiment, the first switching network 130 has a first bi-directional switch 102 connected in series with a second bi-directional switch 104. The first series resonant impedance Zr1 is connected in parallel with the second bi-directional switch 104.

A rectifier switch S7 is connected between a first end 138 of the secondary winding 110 and a first DC node 124. A second end 140 of the secondary winding 110 is connected to a second DC node 126.

The first bi-directional switch 102 includes a first switching device S1 connected in series with a second switching device S2. A source 114 of the first switching device S1 is connected to a source 116 of the second switching device S2.

The second bi-directional switch 104 includes a third switching device S3 connected in series with a fourth switching device S4. A source 118 of the third switching device S3 is connected to a source 120 of the fourth switching device S4.

As illustrated in FIG. 1, the apparatus 100 includes seven switching devices S1, S2, S3, S4, S5, S6, and S7. Each switching device may be a metal oxide semiconductor field effect transistor (MOSFET) having an inherent body diode or antiparallel diode as shown in the illustrated embodiment. Alternatively, each switching device S1, S2, S3, S4, S5, S6, and S7 may be implemented using any suitable type of switching device capable of efficiently switching the desired power at the desired switching frequencies.

The first and second switching network 130, 134, also referred to as active half bridge (AHB) type switching networks, are used to transfer power from an AC voltage Vac to a primary side 142 of the transformer T1. As will be discussed further below, each switching network 130, 134 is operated independently such that only one switching network, 130 or 134, is transferring power at a time resulting in a converter apparatus 100 having two independent power paths, referred to herein as branches. When the first branch is transferring power, both switching devices S5, S6 in the second switching network 134 are off and the first switching network 130 is operated to transfer power from the AC voltage Vac to the first primary winding 106 of the transformer T1. When the second branch is transferring power both bi-directional switches 102, 104 in the first switching network 130 are off and the second switching network 134 is operated to transfer power from the AC voltage Vac to the second primary winding 108 of the transformer T1.

The first switching network 130 is connected between a first AC power node 122 and a second AC power node 128. The first switching network 130 includes a first bi-directional switch 102 connected in series with a second bi-directional switch 104, forming a central node 112. The central node 112 is disposed between the first bi-directional switch 102 and the second bi-directional switch 104.

The first bi-directional switch 102 is formed with the first switching device S1 connected in series with the second switching device S2. In the exemplary embodiment illustrated in FIG. 1 the switching devices S1, S2 are MOSFETs having an inherent body diode disposed in parallel with the switched terminals. Thus, each switching device S1, S2 is capable of blocking current flow in only one direction. By connecting the switching devices S1 and S2 in opposite directions, where the source 114 of the first switching device is connected to the source 116 of the second switching device S2, current flow or voltage can be blocked in both directions by the bi-directional switch 102 when both switching devices S1, S2 are off. Similarly, the second bi-directional switch 104 includes two switching devices S3, S4 connected in series and in opposite directions with the source 118 of the third switching device S3 connected to the source 120 of the fourth switching device S4. The first bi-directional switch 102 and the second bi-directional switch 104 form the first half bridge 130 connected across the input AC voltage Vac.

As used herein, a switching device, such as a MOSFET switching device, is referred to as on or turned on when it is conducting electric current, and referred to as off or turned off when it is not conducting electric current.

The exemplary apparatus 100 includes a first series resonant impedance Zr1 connected in parallel with the second bi-directional switch 104. Alternatively, the first series resonant impedance Zr1 may be advantageously connected in parallel with the first bi-directional switch 102.

The first series resonant impedance Zr1 includes the first resonant inductor Lr1 and the first resonant capacitor Cr1 connected in series with a first winding 106 of a transformer T1. In the exemplary embodiment illustrated in FIG. 1, the first resonant inductor Lr1 is coupled between a central node 112 of the first switching network 130 and the first primary winding 106 of the transformer T1, while the first resonant capacitor Cr1 is coupled between the second AC power node 128 and the first primary winding 106. Alternatively, the three resonant components: the first resonant inductor Lr1, the first resonant capacitor Cr1, and the first primary winding 106, may be connected in series in any desired order to form the first series resonant impedance Zr1.

The transformer T1 includes a first primary winding 106 disposed on a primary side 142 of the transformer T1, and a secondary winding 110 disposed on the secondary side 144 of the transformer T1. The first primary winding 106 is magnetically coupled to the secondary winding 110. A first turn ratio $N_1$ represents a ratio of the number of turns in the first primary 106 winding to the number of turns in the secondary winding 110.

On the secondary side 144, a rectifier switch S7 is connected between a first end 138 of the secondary winding 110 and a first DC node 124, with the second end 140 of the secondary winding 110 connected to a second DC node 126. The rectifier switch S7 may be operated as a synchronous rectifier to convert the AC power from the secondary winding 110 to DC power delivered to a load 146 which may be connected between the first DC node 124 and the second DC node 126. In one embodiment the rectifier switch S7 may be connected between the second end 140 of the secondary winding 110 and the second DC node 126.

A first branch or first power path, as described above, transfers power from the AC voltage Vac through the first switching network 130 and first primary winding 106 to the load 146. This type of active half bridge resonant (AHBR) converter is advantageous when a value of the AC voltage Vac is large. However, at lower values of the AC voltage Vac it may be less desirable than other converter topologies. Because of this, the exemplary apparatus 100 includes a second branch to provide improved performance at lower values of the AC voltage Vac.

A second branch or power path employs a diode bridge 132 coupled to the first AC power node 122 and the second AC power node 128. The diode bridge 132 is configured to receive the AC voltage (Vac) and produce a DC voltage (Vdc). The exemplary diode bridge 132 includes four diodes D1, D2, D3, D3 arranged in a full bridge circuit configuration adapted to provide the same polarity as DC voltage Vdc for either polarity of the AC voltage Vac. Those skilled in the art will readily recognize that any type of rectifier circuit adapted to receive an AC voltage and produce a DC voltage may be advantageously employed without straying from the spirit and scope of the embodiments. In certain embodiments a bus capacitor Cbus may be coupled in parallel with the DC voltage Vdc to help smooth the DC voltage Vdc and reduce voltage stresses and improve performance of the second switching network.

A second switching network 134 is connected across, or in parallel with the DC voltage Vdc. The second switching network includes a fifth switching device S5 connected in series with a sixth switching device S6. A central node 136 is formed between the fifth switching device S5 and the sixth switching device S6.

A second primary winding 108 is magnetically coupled to the secondary winding 110 of the transformer T1. The secondary primary winding 108 receives power from the second switching network 134 through the second series resonant impedance Zr2. A second turn ratio $N_2$ represents a ratio of the number of turns in the second primary winding 108 to the number of turns in the secondary winding 110.

The second series resonant impedance Zr2 includes a second resonant inductor Lr2, a second resonant capacitor Cr2, and the second primary winding 108 connected in series. The magnetizing inductance of the second primary winding 108 joins with the second resonant inductance Lr2 to produce the resonant behaviour of the second series resonant impedance Zr2. The second resonant inductor Lr2, the second resonant capacitor Cr2, and the second primary winding 108 may be advantageously connected in series in any desired order to form the second series resonant impedance Zr2.

In the exemplary apparatus 100 the second series resonant impedance Zr2 is connected in parallel with the sixth switching device S6. Alternatively, the second series resonant impedance Zr2 may be advantageously connected in parallel with the fifth switching device S5.

The exemplary apparatus 100 provides improved system efficiency by converting a majority of the energy only once. In this sense, the exemplary apparatus 100 may be considered a single stage power converter. Improved efficiency is achieved in part by including two power branches. The first branch transfers power from the AC voltage Vac through the first switching network 130 and the first primary winding 106 to the load 146. The second branch transfers power from the AC voltage Vac through the diode bridge 132, the second switching network 134 and the second primary winding 108 to the load 146.

As will be discussed further below, the primary side 142 of the apparatus 100 includes two independent branches with each branch having its own power path components. On the secondary side 144, both branches share a single set of power transfer components. The transformer core is also shared between the two branches. Interference between the two branches is limited by activating only one branch as a time.

In a possible implementation form of the apparatus, an output capacitor Cout is connected across the first DC node and the second DC node. Including the output capacitor Cout provides advantageous filtering of the output power.

During operation, each of the two branches are operated independently and alternately, with only one branch transferring power from the AC input nodes 122, 128 to the DC output nodes 124, 126 at a time. Transition between the two branches is based on a magnitude, or absolute value of, the AC voltage. As used herein the magnitude of the AC voltage is equivalent to an absolute value of the AC voltage, |Vac|. Power is transferred through the first branch when the magnitude of the AC voltage |Vac| is above a predetermined voltage threshold Vth; |Vac|>Vth. Power is transferred through the second branch when the magnitude of the AC voltage |Vac| is not greater than the predetermined voltage threshold Vth; |Vac|≤Vth.

When power is being transferred through the first branch, both switching devices S5 and S6 in the second switching network 134 are turned off and the first switching network 130 is operated to transfer power from the first AC power node 122 and the second AC power node 128 to the first series resonant impedance Zr1. When power is being transferred through the second branch, the four switches S1, S2, S3, S4 in the first switching network 130 are turned off and the second switching network 134 is operated to transfer power from the DC voltage Vdc to the second series resonant impedance Zr2.

The predetermined voltage threshold Vth, used to selectively activate each branch, is determined based on the desired DC output voltage Vo and a turns ratio $N_1$ between the first primary winding 108 and the secondary winding 110 of the transformer T1. The predetermined voltage threshold Vth may be set greater than the turns ratio $N_1$ times the desired output voltage Vo as shown in equation (1):

$$Vth > Vo \cdot N_1 \tag{1}$$

Figure 2:
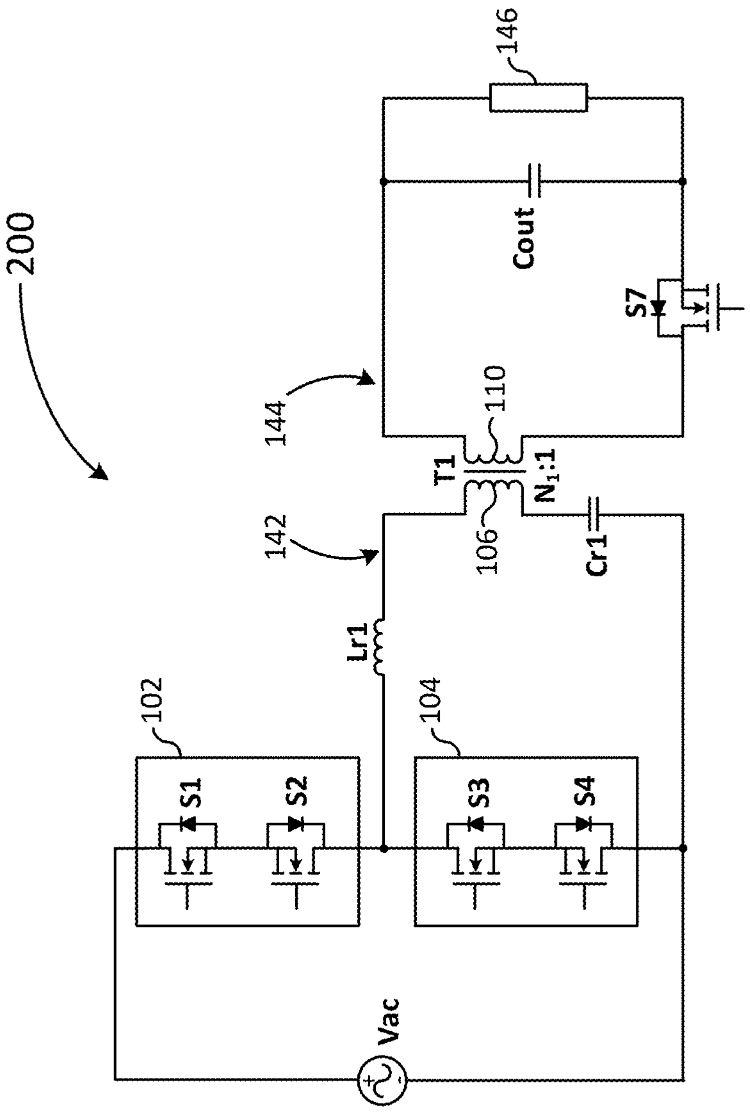
FIG. 2 illustrates a schematic diagram of an exemplary power conversion apparatus incorporating aspects of the embodiments.

FIG. 2 illustrates a schematic diagram of an exemplary power conversion apparatus 200 incorporating aspects of the embodiments. The apparatus 200 of the embodiments, referred to herein as the first branch, depicts a portion of the exemplary power conversion apparatus 100 providing a first power path between the AC voltage Vac and the load 146. The apparatus 200 illustrated in FIG. 2 depicts a portion of the apparatus 100 illustrated in FIG. 1 where like references indicate like elements. Power is transferred through the first branch 200 when the magnitude of the AC voltage |Vac| is above the predetermined voltage threshold Vth; |Vac|>Vth.

An understanding of the operating principles of the apparatus 200, is aided by considering each of its two operating modes separately. The first operating mode to be considered is when the AC voltage Vac is greater than the voltage threshold Vth; Vac>Vth.

Figure 3:
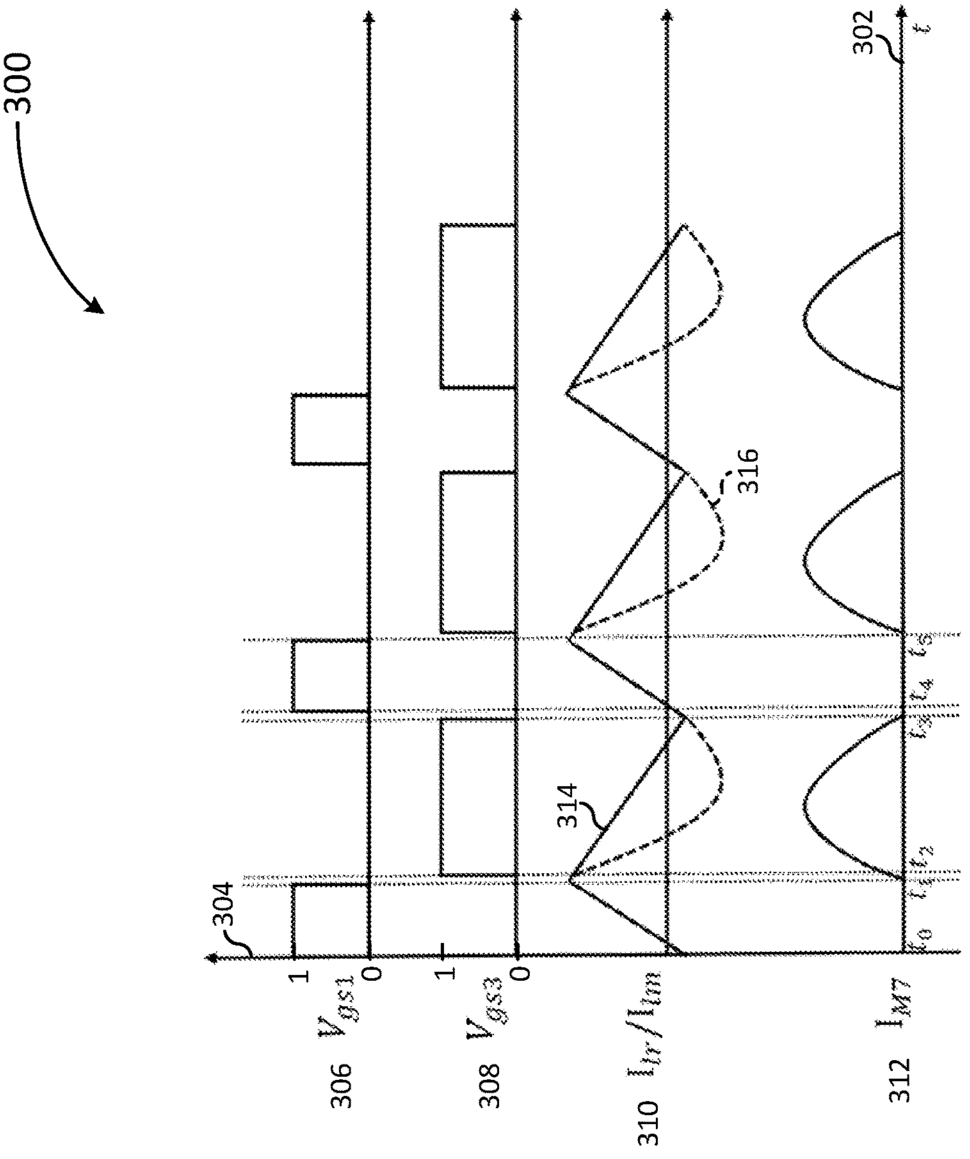
FIG. 3 illustrates graphs showing operating waveforms of the exemplary apparatus incorporating aspects of the embodiments.

FIG. 3 illustrates graphs 300 showing operating waveforms of the exemplary apparatus 200 during the first operating mode incorporating aspects of the embodiments. In the graphs 300, time is depicted along a horizontal axis 302 increasing to the right, while magnitude is depicted in each of the graphs 306, 308, 310, and 314 along a vertical axis 304 increasing upwards. Control signals $V_{gs1}$, $V_{gs3}$ for the first switching device S1 and the third switching device S3 are depicted in graphs 306 and 308 respectively, where a value of one (1) turns the corresponding switching device on and a value of zero (0) turns the corresponding switching device off. Graph 310 depicts the current $I_{lr1}$ through the first resonant inductor Lr1 and the first magnetizing current $I_{lm1}$ of the transformer T1, where the line 314 depicts the first magnetizing current $I_{lm1}$ and the dashed line 316 depicts the first resonant inductor current $I_{lr1}$. Graph 312 depicts current $I_{M7}$ through the SR component S7.

During the first operating mode both the second switching device S2 and the fourth switching device S4 remain on. The rectifier switch S7 is operated as a synchronous rectifier (SR) component to convert a voltage of the secondary winding 110 to a DC power. The current through the seventh switching device S7 is represented as $I_{M7}$ in the graph 312.

Both switching networks 130, 134 and the SR component S7, are operated at the same switching frequency, which is set much higher, for example two or more orders of magnitude higher, than the frequency of the AC voltage Vac. In certain embodiments the AC voltage Vac may be supplied by the local grid power and may have a frequency of about fifty (50) or sixty (60) Hertz. Because the switching frequency of the switching devices S1 through S7 is much higher than the AC input voltage Vac, the AC voltage Vac may be treated as a constant input voltage $V_{in}$ throughout the following analysis.

Referring again to the graphs 300 it can be seen that during the time interval between time $t_0$ and time $t_1$, the first switching device S1 is on and the third switching device S3 is off. During this time interval the magnetizing current of the first primary winding 106 of the transformer T1 is increasing as shown in equation (2):

$$I_{lr1}(t) = I_{lm1}(t) = I_{0lr1} + \frac{V_{in} - V_{cr1}}{Lr1 + Lm1} \cdot t \tag{2}$$

where $V_{cr1}$ is the average voltage of the first resonant capacitor Cr1, Lm1 is a value of the magnetizing inductance of the first primary winding 106 of transformer T1, $I_{lr1}$ is the current through the first resonant inductor Lr1, and $I_{0lr1}$ is an initial current through the first resonant inductor Lr1 at the beginning of the time interval.

At time $t_1$ the first switching device S1 is turned off and current begins to flow through a body diode of the third switching device S3. At time $t_2$ the third switching device S3 reaches a zero-voltage switching (ZVS) condition and is turned on. During the time interval between time $t_2$ and $t_3$ the rectifier switch S7 begins to conduct. Conduction is initiated due to the voltage of the first resonant capacitor $V_{cr1}$ divided by the turns ratio $N_1$ being greater than the DC output voltage $$Vo; \frac{V_{cr1}}{N_1} > Vo.$$

The first resonant inductor Lr1 and the first resonant capacitor Cr1 form a resonant circuit where the current through the first resonant inductor/In is given by equation (3):

$$I_{lr}(t) = I_{lr1} \cdot \cos(\omega(t - t_2)) + \frac{(N_1 \cdot Vo - V_{crini})}{Z_1} \cdot \sin(\omega(t - t_2)), \tag{3}$$

where the value ω is given by equation (4):

$$\omega = \frac{1}{\sqrt{Lr1 \cdot Cr1}}, \tag{4}$$

and the first impedance $Z_1$ is given by equation (5):

$$Z_1 = \sqrt{\frac{Lr1}{Cr1}}. \tag{5}$$

The value $V_{crini}$ is the initial voltage across the first resonant capacitor Cr1 before the resonance begins.

Magnetizing current through the first primary winding $I_{lm1}$ is given by equation (6):

$$I_{lm1}(t) = I_{0lr1} - \frac{N_1 \cdot Vo}{Lm1}(t - t_2). \tag{6}$$

The current difference between the current through the first resonant inductor $I_{lr1}$ and the magnetizing current $I_{lm1}$ is transferred to the secondary side 144 of the transformer as shown in equation (7):

$$I_{M7} = (I_{lm1} - I_{lr1}) \cdot N_1. \tag{7}$$

At time $t_3$ the third switching device S3 is turned off, and at time $t_4$ the first switching device S1 is turned on. It is important to ensure that the magnetizing current is negative at time $t_3$ to facilitate zero voltage switching (ZVS) of the first switching device S1.

The output voltage Vo during the first operating mode is given by equation (8):

$$Vo = \frac{V_{in} \cdot D_1}{N_1}, \tag{8}$$

where $D_1$ is the duty ratio of the first switching device S1.

During the second operating mode of the first branch, the AC voltage Vac is less than a negative of the voltage threshold; Vac<−Vth. Both the first switching device S1 and the third switching device S3 remain on, while the second switching device S2 and the fourth switching device are operated to regulate power flow between the input voltage $V_{in}$ and the first series resonant impedance Zr1. The rectifier switch S7 is operated as a synchronous rectifier (SR) component to convert a voltage of the secondary winding 110 to a DC power.

Figure 4:
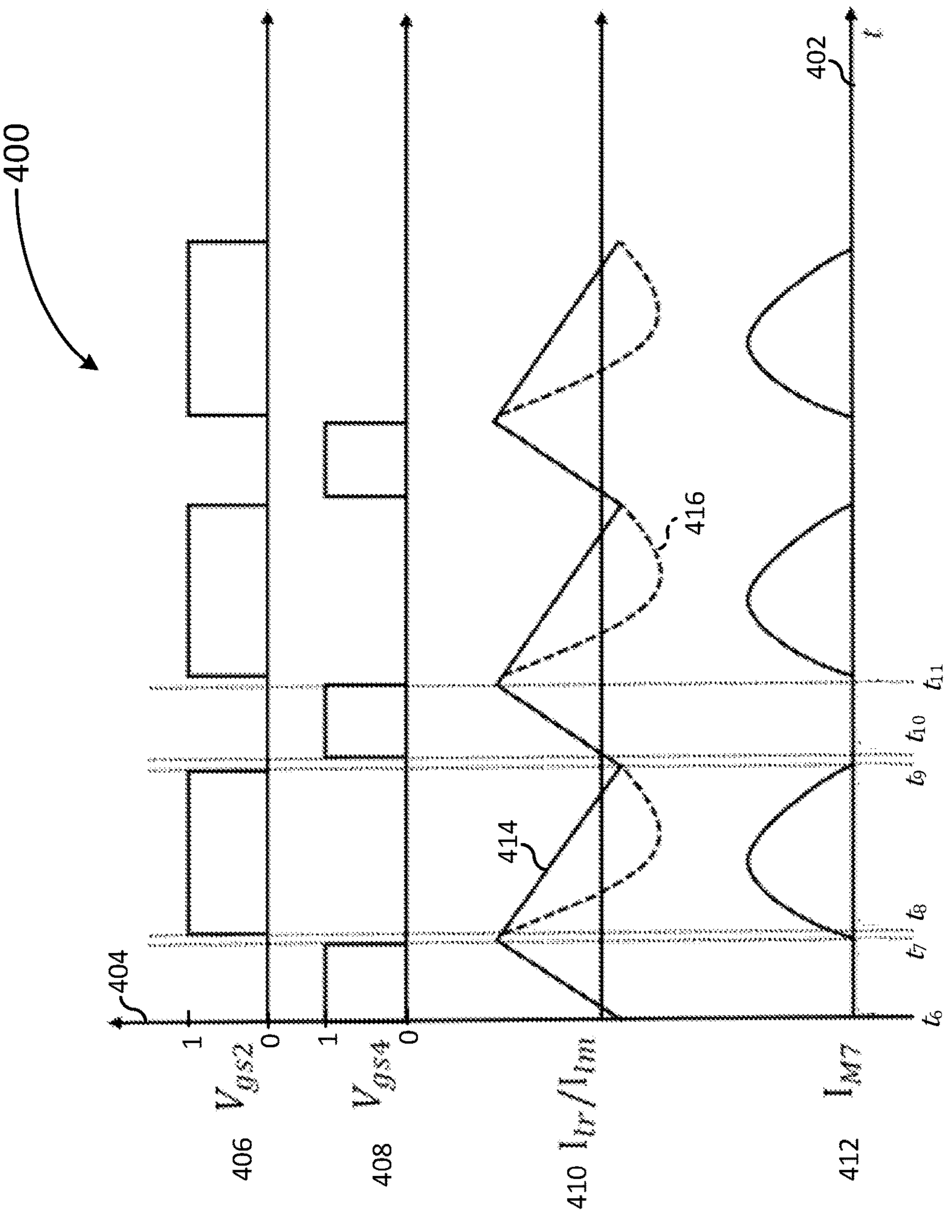
FIG. 4 illustrates graphs showing operating waveforms of an exemplary apparatus incorporating aspects of the embodiments.

FIG. 4 illustrates graphs 400 showing operating waveforms of the exemplary apparatus 200 during the second operating mode incorporating aspects of the embodiments. In the graphs 400, time is depicted along a horizontal axis 402 increasing to the right while magnitude is depicted in each of the graphs 406, 408, 410, and 414 along a vertical axis 404 increasing upwards. Control signals $V_{gs2}$, $V_{gs4}$ for the second switching device S2 and the fourth switching device S4 are depicted in graphs 406 and 408 respectively, where a value of one (1) turns the corresponding switching device on and a value of zero (0) turns the corresponding switching device off. Graph 410 depicts the current $I_{lr1}$ through the first resonant inductor Lr1 and the first magnetizing current $I_{lm1}$ of the first primary winding 106, where the line 414 depicts the first magnetizing current $I_{lm1}$ and the dashed line 416 depicts the first resonant inductor current $I_{lr1}$. Graph 412 depicts current $I_{M7}$ through the SR component S7.

Prior to time to the magnetizing current $I_{lm1}$ is negative and current is flowing through the body diode of the fourth switching device S4, thereby allowing ZVS while turning the fourth switching device S4 on. During the time interval between time $t_6$ and time $t_7$, the fourth switching device S4 is turned on and the second switching device S2 is turned off. The magnetizing current $I_{lm}$ during this period is given by equation (9):

$$I_{lr1}(t) = I_{lm1}(t) = I_{0lr1} + \frac{V_{cr1}}{Lr1 + Lm1} \cdot t \tag{9}$$

At time $t_7$ the fourth switching device S4 is turned off and current begins flowing through the body diode of the second switching device S2, thereby providing ZVS while turning the second switching device S2 on.

During the time interval between time $t_8$ and time $t_9$ the current through the first resonant inductor $I_{lr1}$ and the magnetizing current $I_{lm1}$ may be found using equation (10):

$$I_{lr1}(t) = I_{0lr1} \cdot \cos(\omega(t - t_8)) + \frac{N_1 \cdot Vo - (Vin - V_{crini2})}{Z} \cdot \sin(\omega(t - t_8)), \tag{10}$$

where $V_{crini2}$ is the initial voltage across the first resonant capacitor Cr1 before the resonance starts, and $l_{0lr1}$ is the initial current through the first resonant inductor Lr1.

The magnetizing current during this time interval is shown in equation (11):

$$I_{lm1}(t) = I_{0lr1} - \frac{N_1 \cdot Vo}{Lm1}(t - t_8). \tag{11}$$

The current difference between the current through the first resonant inductor $I_{lr1}$ and the magnetizing current $I_{lm1}$ is transferred to the secondary side 144 of the transformer as shown in equation (7) above. The output voltage Vo is shown in equation (12):

$$Vo = \frac{V_{in} \cdot (1 - D_2)}{N_{13}}, \tag{12}$$

where $D_2$ is the duty ratio of the second switching device S2.

Figure 5:
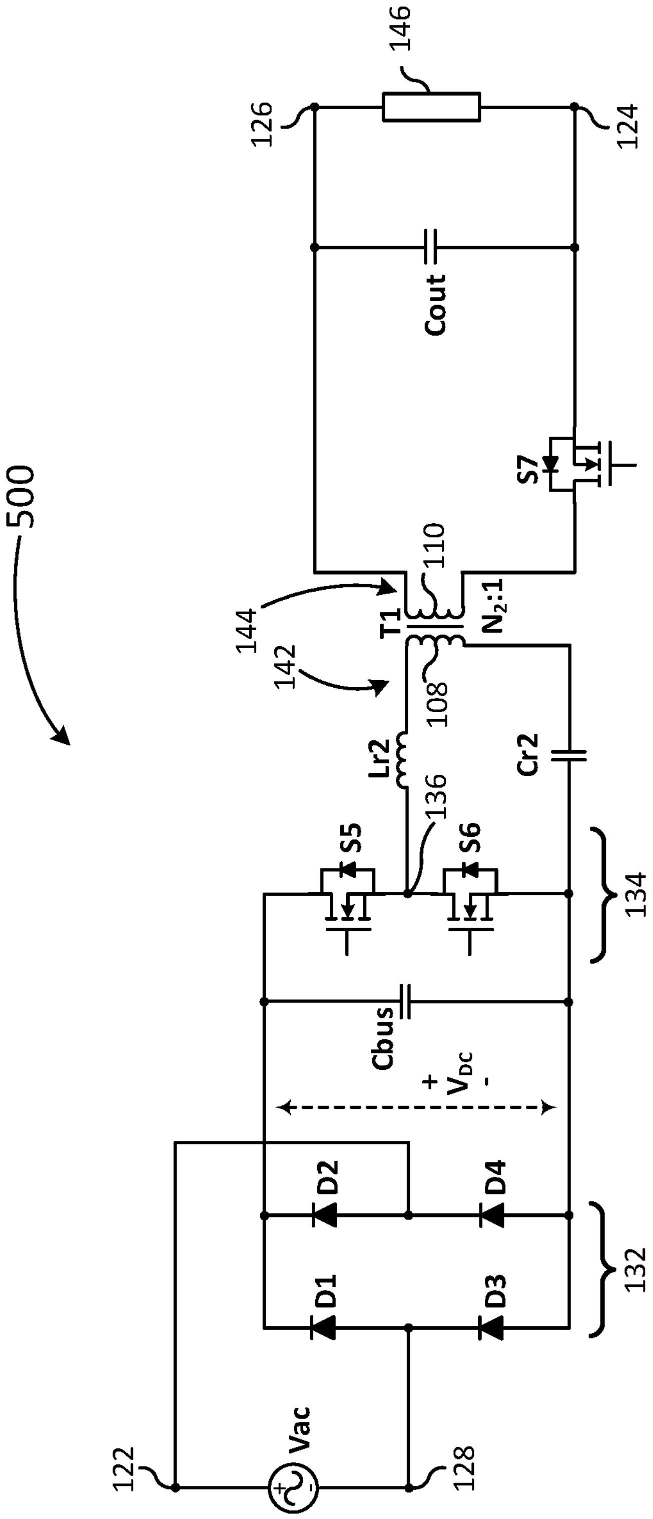
FIG. 5 illustrates a schematic diagram of an exemplary apparatus incorporating aspects of the embodiments.

FIG. 5 illustrates a schematic diagram of an exemplary power conversion apparatus 500 incorporating aspects of the embodiments. The apparatus 500 of the embodiments, referred to herein as the second branch, depicts a portion of the exemplary power conversion apparatus 100 providing a second power path between the AC voltage Vac and the load 146. The apparatus 500 illustrated in FIG. 5 depicts a portion of the apparatus 100 illustrated in FIG. 1 where like references indicate like elements. Power is transferred through the second branch when the magnitude of the AC voltage |Vac| is not greater than the predetermined voltage threshold Vth, |Vac|≤Vth.

The second branch 500 includes a diode bridge 132 to rectify the AC voltage Vac and produce a DC voltage Vdc. An energy storage capacitor Cbus smooths the DC voltage Vdc, and a second switching network 134 converts the DC voltage Vdc to AC power. A second series resonant impedance Zr2 connects the second switching network 134 to the second primary winding 108 and includes a second resonant inductor Lr2 and a second resonant capacitor Cr2 which in addition to participating in the resonance, acts as a blocking capacitor to block DC bias created by the second switching network 134. On the secondary side of the transformer 144, the rectifier switch S7 acts as a SR component to provide DC power to the load 146.

The apparatus 500, also referred to the second branch, converts the energy twice. First, the AC voltage Vac is converted to a DC voltage Vdc by the diode bridge 134 and stored in an energy storage capacitor Cbus. The second energy conversion is performed by the AHBR converter that includes the second switching network 134, the second series resonant impedance Zr2 and the SR component S7. Operation of the second AHBR energy conversion is described in more detail below.

Figure 6:
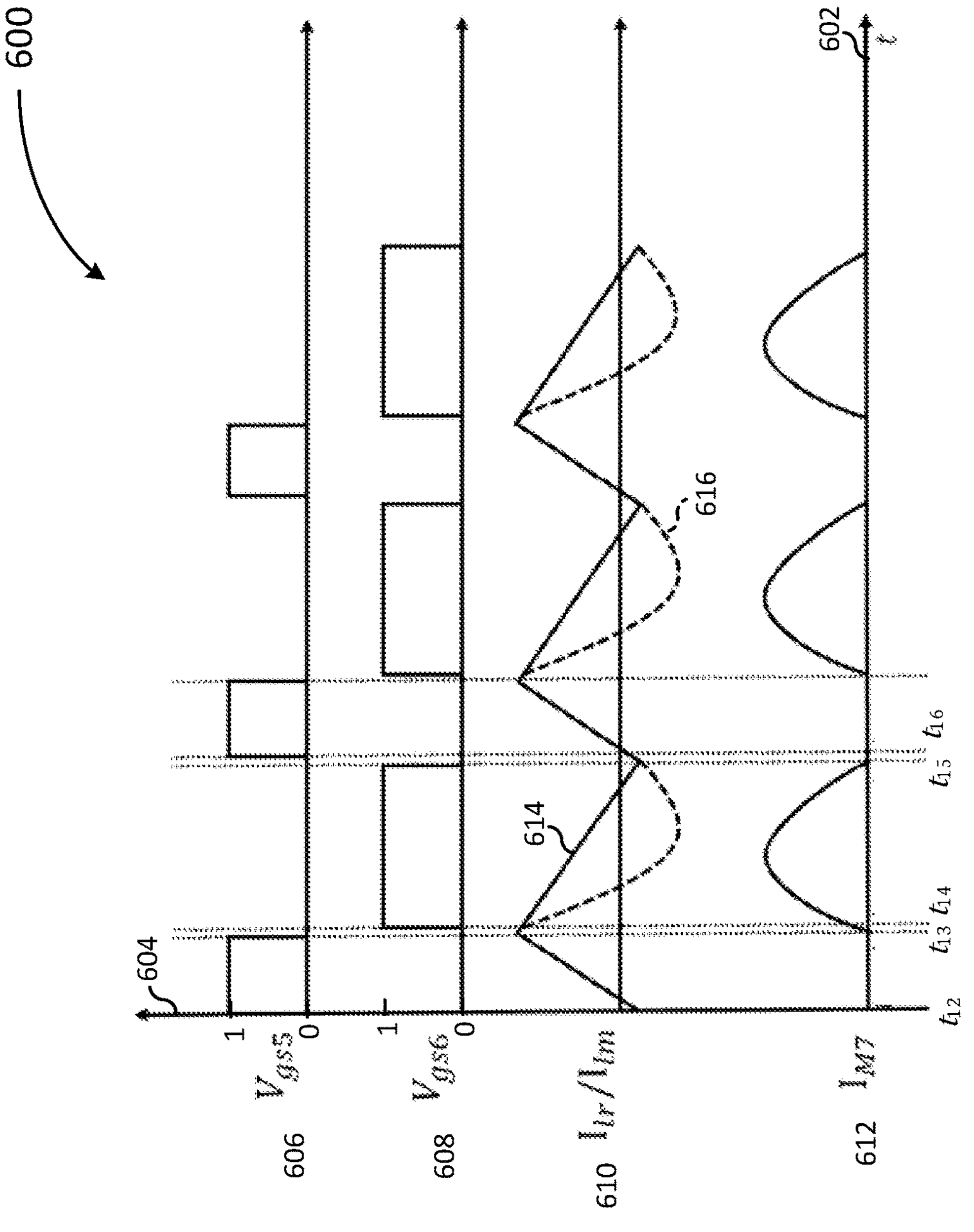
FIG. 6 illustrates graphs showing operating waveforms of an exemplary apparatus incorporating aspects of the embodiments.

FIG. 6 illustrates graphs 600 showing operating waveforms of the exemplary apparatus 500 incorporating aspects of the embodiments. In the graphs 600, time is depicted along a horizontal axis 602 increasing to the right while magnitude is depicted in each of the graphs 606, 608, 610, and 614 along a vertical axis 604 increasing upwards. Control signals $V_{gs5}$, $V_{gs6}$ for the fifth switching device S5 and the sixth switching device S6 are depicted in graphs 606 and 608 respectively, where a value of one (1) turns the corresponding switching device on and a value of zero (0) turns the corresponding switching device off. Graph 610 depicts the current $I_{lr2}$ through the second resonant inductor Lr2 and the second magnetizing current $I_{lm2}$ of the second primary winding 108, where the line 614 depicts the second magnetizing current $I_{lm2}$ and the dashed line 616 depicts the second resonant inductor current $I_{lr2}$. Graph 612 depicts current $I_{M7}$ through the SR component S7.

During the time interval between time $t_{12}$ and time $t_{13}$, the fifth switching device S5 is on and the sixth switching device S6 is off, and the magnetizing current of the transformer is increasing according to equation (14):

$$I_{lr2}(t) = I_{lm2}(t) = I_{0lr2} + \frac{V_{in} - V_{cr2}}{Lr2 + Lm2} \cdot t, \tag{14}$$

where $I_{lr2}$ is the current through the second resonant inductor Lr2, $I_{lm2}$ is the magnetizing current of the second primary winding 110 of the transformer T1, Lm2 is the magnetizing inductance of the second primary winding 110, $V_{cr2}$ is the average voltage of the second resonant capacitor Cr2, and $I_{0lr2}$ is the initial current of the second resonant inductance Lr2 at the beginning of the interval $t_{12}$.

At time $t_{13}$ the fifth switching device S5 is off and current begins to flow through the body diode of the sixth switching device S6. This allows ZVS of the sixth switching device S6 at time $t_{14}$.

During the time interval between $t_{14}$ and time $t_{15}$ the average voltage of the second resonant capacitor $V_{cr2}$ divided by the turn ratio $N_2$ between the second primary winding 108 and the secondary winding $$110\left(\frac{V_{cr2}}{N_2}\right)$$

is higher than the output voltage Vo. This causes the body diode of the rectifier switch S7 to begin conducting current thereby inducing resonance in the second series resonant impedance Zr2. The current in the second resonant inductance Lr2 is given by equation (15):

$$I_{lr2}(t) = I_{1lr2} \cdot \cos(\omega(t - t_{14})) + \frac{(N_2 \cdot Vo - V_{cr2ini})}{Z_2} \cdot \sin(\omega(t - t_{14})), \tag{15}$$

where the value ω is given by equation (16):

$$\omega = \frac{1}{\sqrt{Lr2 \cdot Cr2}}, \tag{16}$$

and the second impedance $Z_2$ is given by equation (17):

$$Z_2 = \sqrt{\frac{Lr2}{Cr2}}, \tag{17}$$

where $V_{cr2ini}$ is the initial voltage across the second resonant capacitor before resonance begins, $I_{1lr2}$ is the initial inductor current in the second resonant inductor Lr2 at the beginning of the time interval, and $N_2$ is the turn ratio between the second primary winding 108 and the secondary winding 110.

The magnetizing current $I_{lm2}$ in the second primary winding is given by equation (18):

$$I_{lm2}(t) = I_{1lr2} - \frac{N_2 \cdot Vo}{Lm2}(t - t_{14}). \tag{18}$$

The difference between the current through the second resonant inductor $I_{lr2}$ and the magnetizing current $I_{lm2}$ of the second primary winding 110 is transferred to the secondary side 144 of the transformer and flows through the rectifier switch S7. The current through the rectifier switch $I_{M7}$ is given by equation (19):

$$I_{M7} = (I_{lm2} - I_{lr2}) \cdot N_2. \tag{19}$$

At time $t_{15}$ the sixth switching device S6 is turned off. It is also important that the magnetizing current $I_{lm2}$ is negative at time $t_{15}$ to ensure the fifth switching device S5 experiences ZVS when it turns on at time 16. The output voltage during this time period is given by equation (20):

$$Vo = \frac{V_{in} \cdot D_5}{N_2}, \tag{20}$$

where $D_5$ is the duty ratio of the fifth switching device S5.

Figure 7:
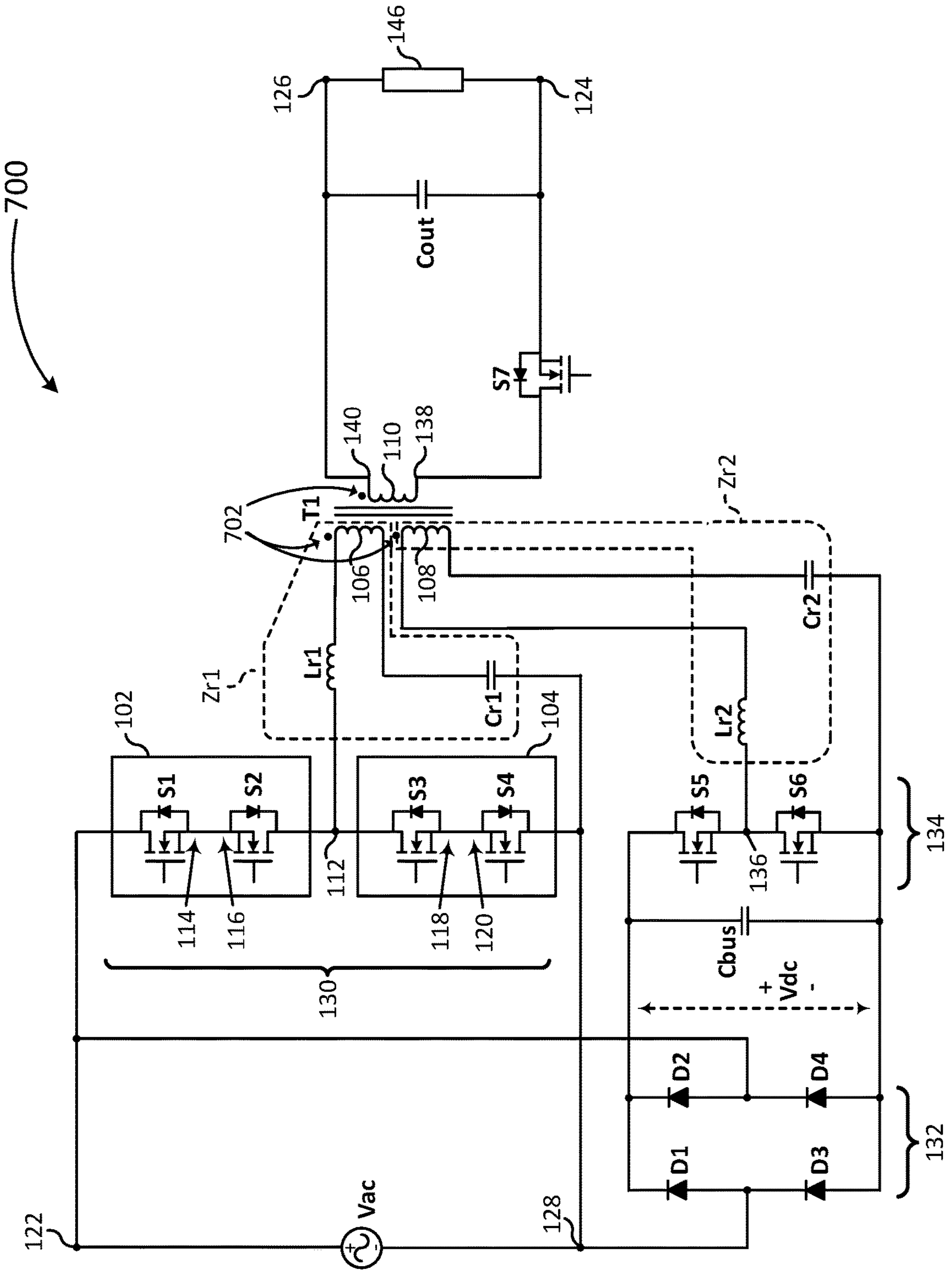
FIG. 7 illustrates a schematic diagram of an exemplary power conversion apparatus incorporating aspects of the embodiments.

FIG. 7 illustrates a schematic diagram of an exemplary power conversion apparatus 700 incorporating aspects of the embodiments. The exemplary apparatus 700 is similar to the exemplary apparatus 100 described above and with reference to FIG. 1, where like references indicate like elements. In the exemplary apparatus 100 the polarity of the transformer T1 windings 106, 108, 110 have been deliberately omitted in the illustrated apparatus 100. The polarity was omitted to highlight a feature of the exemplary apparatus 100 where any suitable polarity of the three transformer windings 106, 108, 110 may be advantageously employed without straying from the spirit and scope of the embodiments.

To illustrate this feature, the exemplary apparatus 700 includes polarity designations 702 for the three transformer windings 106, 108, 110. As used herein, transformer winding polarity is marked by placing a dot at one end of each transformer winding, where, as is typical of transformer polarity marking, a current flowing into the dotted end of a primary winding results in a corresponding current flowing out of the dotted end of a secondary winding. The exemplary power converter apparatus 700 is, when the two switching networks 130, 132 and the SR component S7 are appropriately operated, equivalent to the exemplary apparatus 100 described above.

Figure 8:
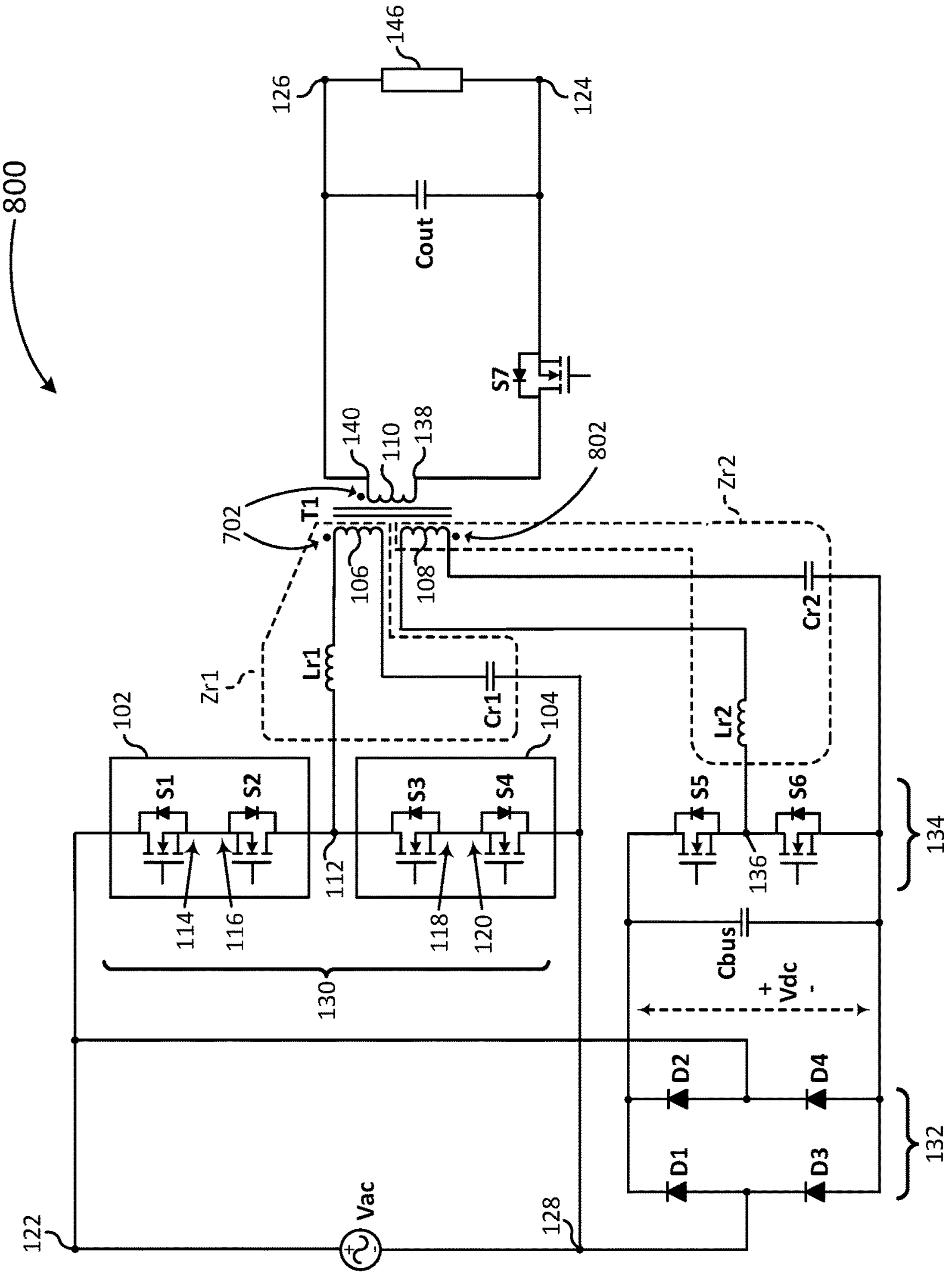
FIG. 8 illustrates a schematic diagram of an exemplary power conversion apparatus incorporating aspects of the embodiments.

FIG. 8 illustrates a schematic diagram of an exemplary power conversion apparatus 800 incorporating aspects of the embodiments. The exemplary apparatus 800 is similar to the exemplary apparatus 100 described above and with reference to FIG. 1, where like references indicate like elements. In the apparatus 800, the polarity of the second primary winding 108, as indicated by the polarity mark 802, is reversed from the polarity illustrated in the exemplary apparatus 700 described above and with reference to FIG. 7. When the second switching network 134 is appropriately operated, the exemplary apparatus 800 becomes equivalent to the exemplary apparatus 700 and provides similar power conversion characteristics.

Figure 9:
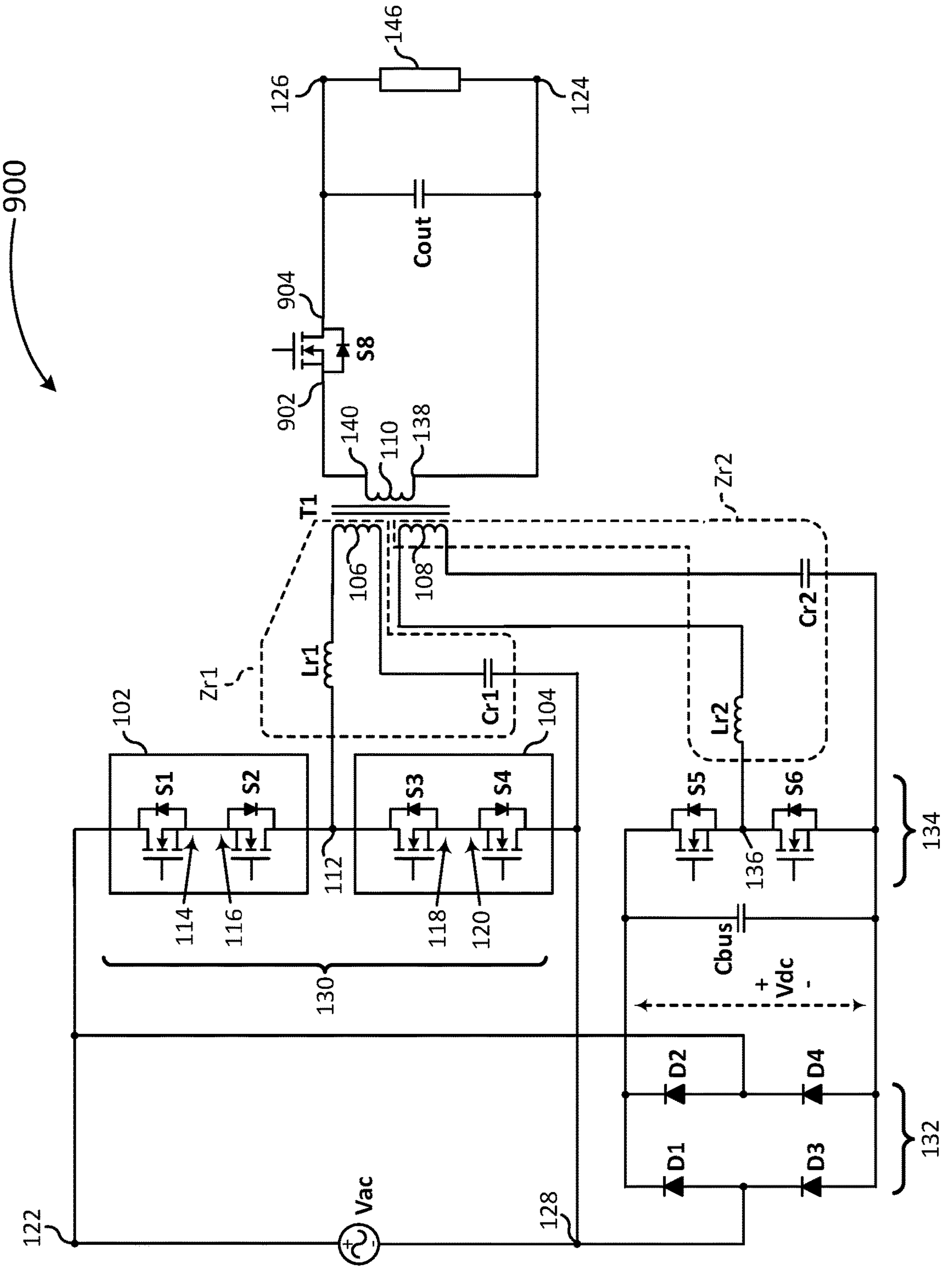
FIG. 9 illustrates a schematic diagram of an exemplary power conversion apparatus incorporating aspects of the embodiments.

FIG. 9 illustrates a schematic diagram of an exemplary power conversion apparatus 900 incorporating aspects of the embodiments. The exemplary apparatus 800 is similar to the exemplary apparatus 100 described above and with reference to FIG. 1, where like references indicate like elements. In the exemplary apparatus 900, the position of the SR component S8 has been moved, as compared to the SR component S7 of apparatus 100, where the SR component S8 is connected between the second end 140 of the secondary winding 110 and the second DC node 126. The exemplary apparatus 900 is equivalent to the exemplary apparatus 100 and, when the SR component S8 is appropriately operated, provides equivalent power conversion characteristics.

It should be noted that with the SR component S8 oriented as shown, with its source 902 connected to the secondary winding 110 and its drain connected to the second DC node, the apparatus 900 provides a DC power to the load 146 with the same polarity as provided by the apparatus 100 describe above. Alternatively, the SR component S8 may have its polarity reversed where the source 902 is connected to the second DC node 126 and the drain connected to the secondary winding 110. When the SR component S8 is connected with this reversed polarity and appropriately operated, the polarity of the DC power delivered to the load 146 will be reversed.

Figure 10:
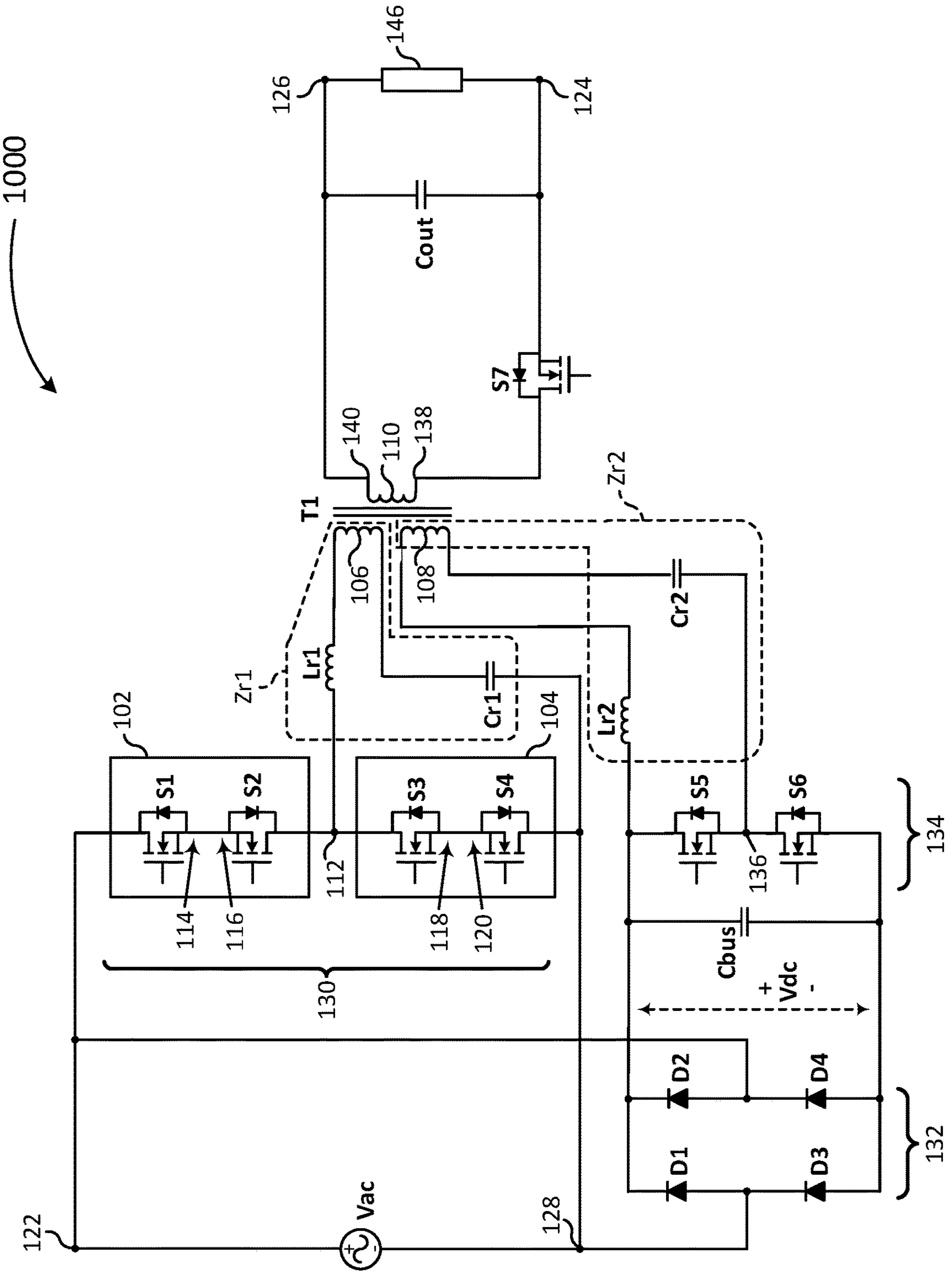
FIG. 10 illustrates a schematic diagram of an exemplary power conversion apparatus incorporating aspects of the embodiments.

FIG. 10 illustrates a schematic diagram of an exemplary power conversion apparatus 1000 incorporating aspects of the embodiments. The exemplary apparatus 1000 is similar to the exemplary apparatus 100 described above and with reference to FIG. 1, where like references indicate like elements. In contrast to the exemplary apparatus 100 described above, the second series resonant impedance Zr2 in the exemplary apparatus 1000 is connected in parallel with the fifth switching device S5. Moving parallel connection of the second series resonant impedance Zr2 from the sixth switching device S6, as is shown in apparatus 100 above, to the fifth switching device S6, yields a power conversion apparatus 1000 that is equivalent to the exemplary apparatus 100.

Figure 11:
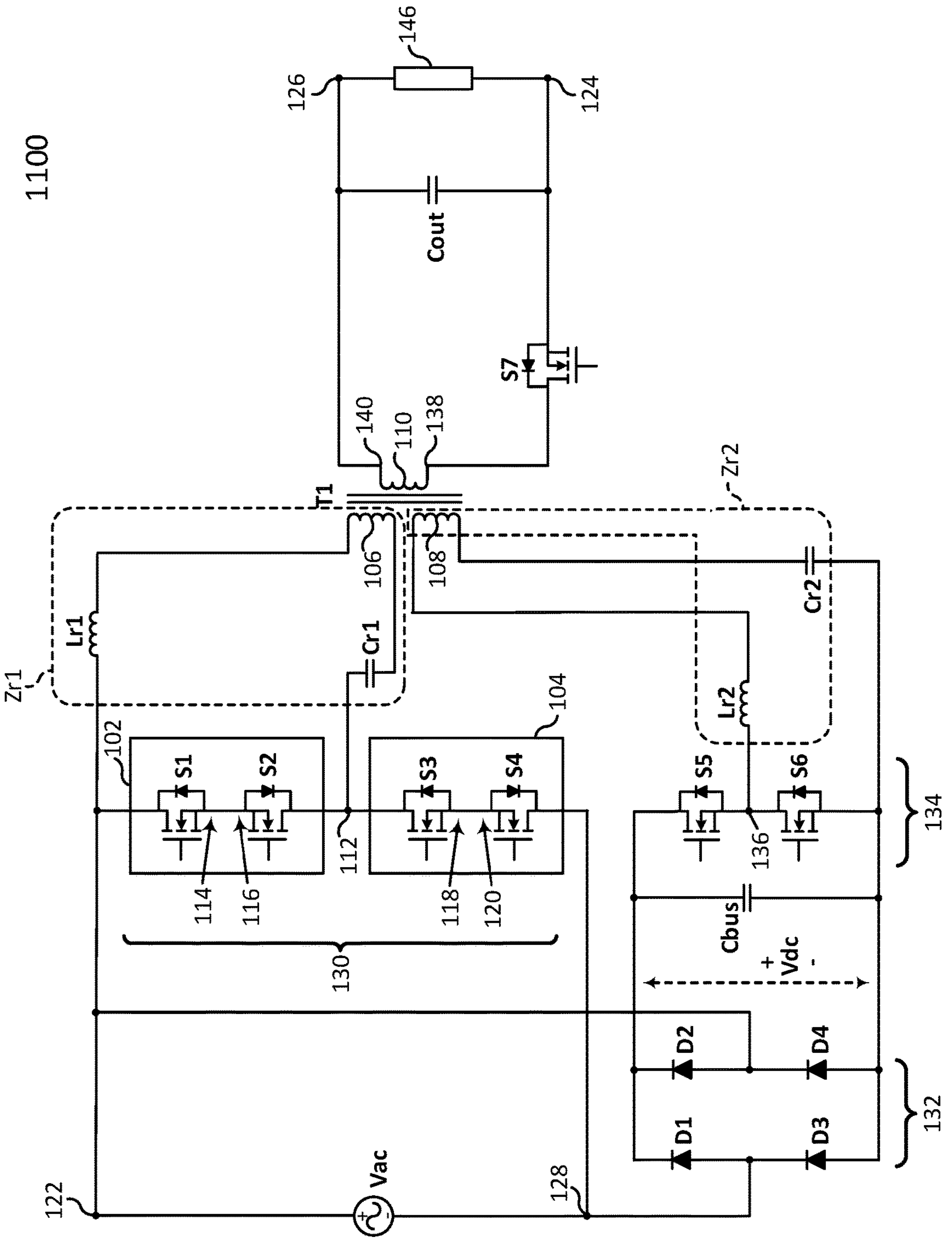
FIG. 11 illustrates a schematic diagram of an exemplary power conversion apparatus incorporating aspects of the embodiments.

FIG. 11 illustrates a schematic diagram of an exemplary power conversion apparatus 1100 incorporating aspects of the embodiments. The exemplary apparatus 1100 is similar to the exemplary apparatus 100 described above and with reference to FIG. 1, where like references indicate like elements. In contrast to the exemplary apparatus 100 described above, the first series resonant impedance Zr1 in the exemplary apparatus 1100 is connected in parallel with the first bi-directional switch 102. Moving parallel connection of the first series resonant impedance Zr1 from the second bi-directional switch 104, as is shown in apparatus 100 above, to the first bi-directional switch 102, yields a power conversion apparatus 1100 that is equivalent to the exemplary apparatus 100 described above.

Figure 12:
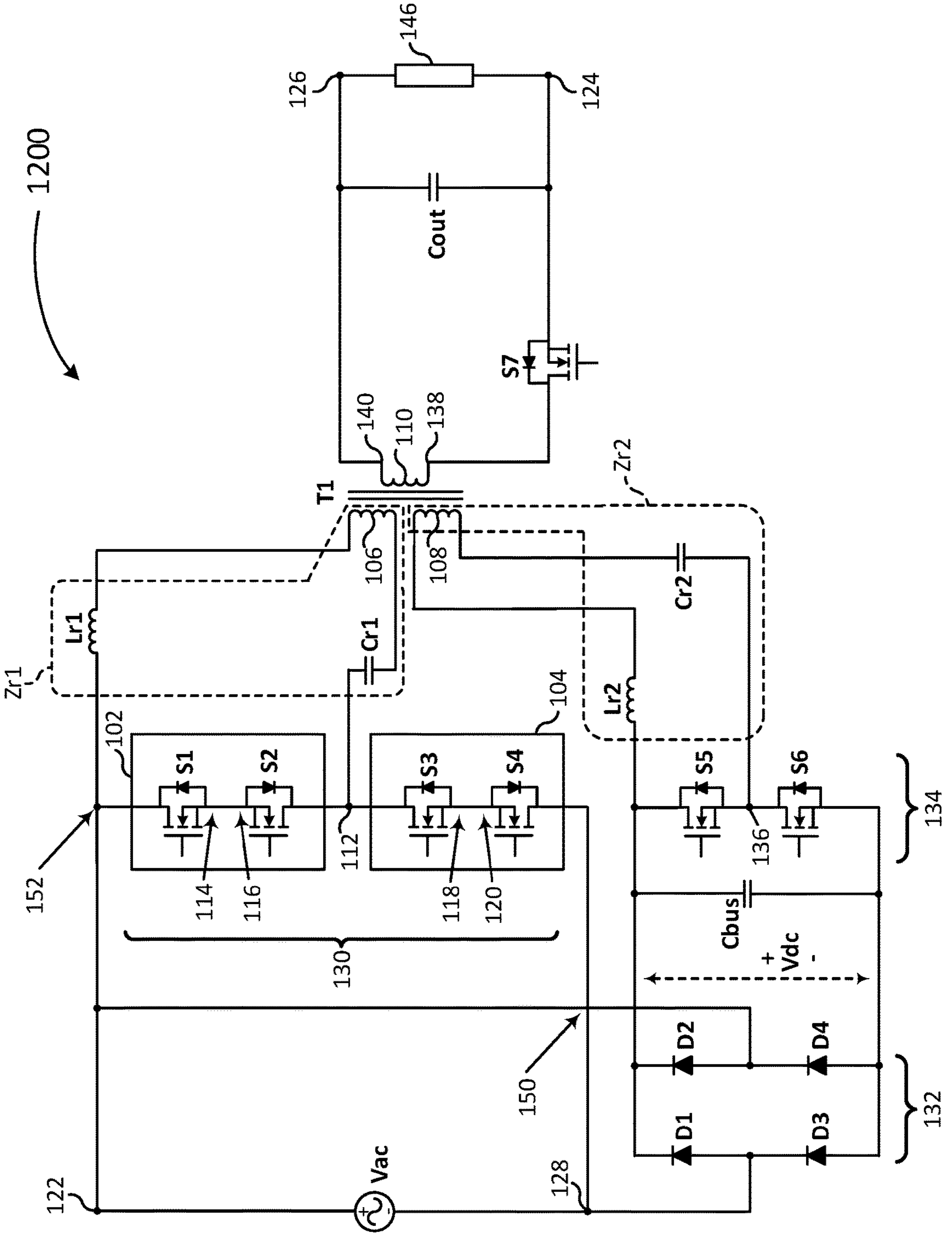
FIG. 12 illustrates a schematic diagram of an exemplary power conversion apparatus incorporating aspects of the embodiments.

FIG. 12 illustrates a schematic diagram of an exemplary power conversion apparatus 1200 incorporating aspects of the embodiments. The exemplary apparatus 1200 is similar to the exemplary apparatus 100 described above and with reference to FIG. 1, where like references indicate like elements. In contrast to the exemplary apparatus 100 described above, the second series resonant impedance Zr2 in the exemplary apparatus 1200 is connected in parallel with the fifth switching device S5. In further contrast to the exemplary apparatus 100 described above, the first series resonant impedance Zr1 in the exemplary apparatus 1200 is connected in parallel with the first bi-directional switch 102. Altering the parallel connections of both the first series resonant impedance Zr1 and the second series resonant impedance Zr2 as shown in the exemplary apparatus 1200 yields a power conversion apparatus that is equivalent to and provides equivalent power conversion characteristics as the exemplary apparatus 100 described above.

Figure 13:
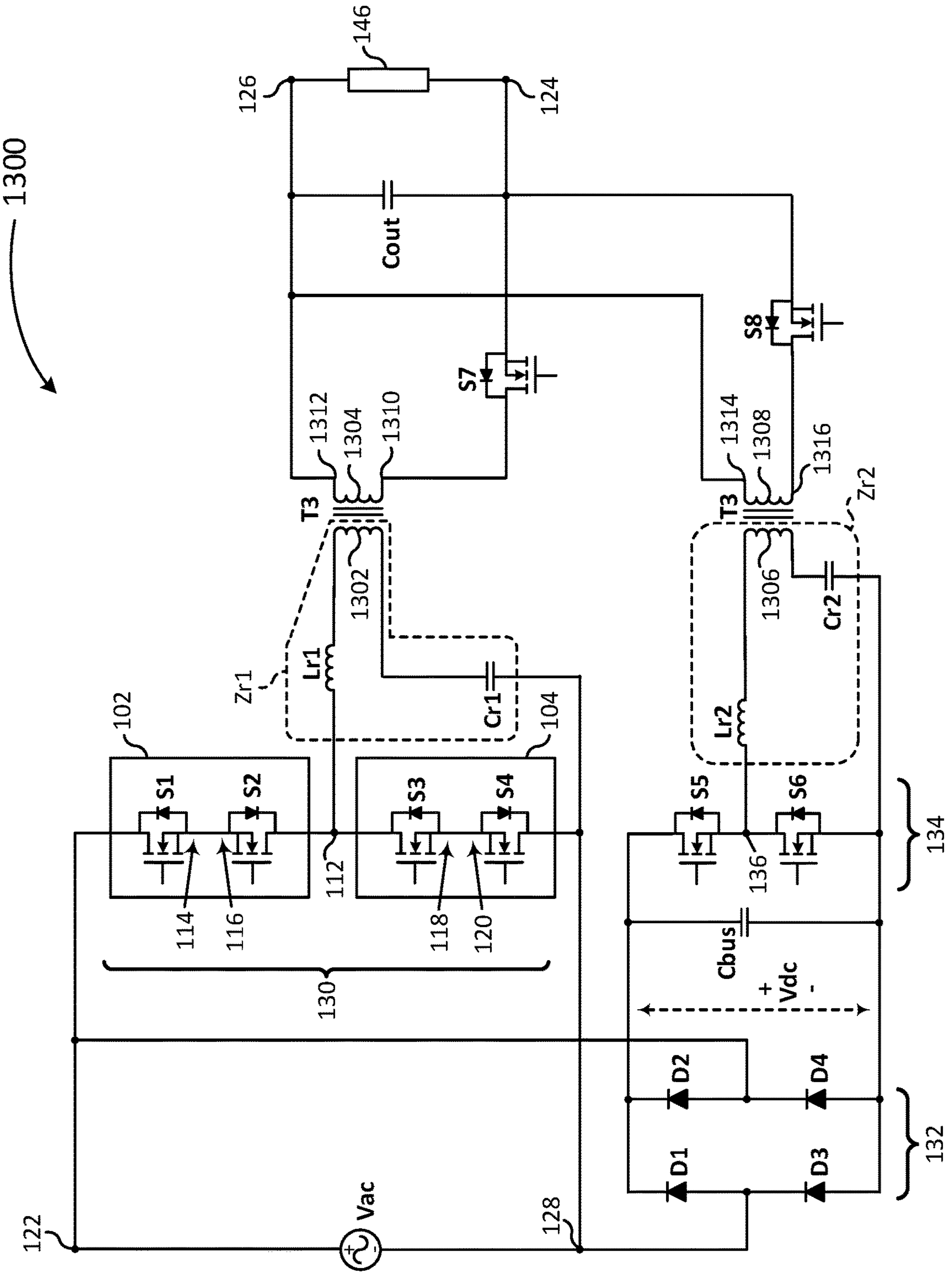
FIG. 13 illustrates a schematic diagram of an exemplary power conversion apparatus incorporating aspects of the embodiments.

FIG. 13 illustrates a schematic diagram of an exemplary power conversion apparatus 1300 incorporating aspects of the embodiments. The exemplary apparatus 1300 is similar to the exemplary apparatus 100 described above and with reference to FIG. 1, where like references indicate like elements. The exemplary apparatus 1300 employs dual transformers T2, T3 to provide power conversion characteristics similar to the apparatus 100 described above.

In the illustrated embodiment of apparatus 1300, a second transformer T2 is configured to transfer power from the first series resonant impedance Zr1 to the load 146, and a third transformer T3 is configured to transfer power from the second series resonant impedance Zr2 to the load 146. In the exemplary apparatus 1300 the first series resonant impedance Zr1 includes a first winding 1302 of the second transformer T2 connected in series with the first resonant inductor Lr1 and the first resonant capacitor Cr1. A first end 1310 of the secondary winding 1304 of the second transformer T2 is coupled through the SR switching device S7 to the first DC node 124. A second end 1312 of the secondary winding 1304 of the second transformer T2 is coupled to the second DC node 126.

The second series resonant impedance Zr2 includes a first winding 1306 of the third transformer T3 connected in series with the second resonant inductor Lr2 and the second resonant capacitor Cr2. A first end 1314 of the secondary winding 1308 of the third transformer T3 is connected to the second DC node 126. The second end 1316 of the secondary winding 1308 is coupled through a SR switching device S8 to the first DC node 124. The apparatus 1300 provides similar dual branch power conversion characteristics as the apparatus 100 described above.

Employing the dual branch topology as shown in the apparatus 100 provides a direct power AC/DC conversion apparatus 100 capable of WIWO operation suitable for many of today charger applications. In the apparatus 100, soft switching can be achieved in all working modes and the majority of the energy is processed only once, resulting in a direct power AC/DC converter capable of high efficiency operation. The bridgeless structure may contribute to high system efficiency.

Thus, while there have been shown, described and pointed out features of the exemplary embodiments, it will be understood that various omissions, substitutions and changes in the form and details of devices and methods illustrated, and in their operation, may be made by those skilled in the art without departing from the spirit and scope of the embodiments. Further, it is expressly intended that all combinations of those elements, which perform substantially the same function in substantially the same way to achieve the same results, are within the scope of the embodiments. Moreover, it should be recognized that structures and/or elements shown and/or described in connection with any form or embodiment may be incorporated in any other described or suggested form or embodiment.

What is claimed is:

1. An apparatus, comprising: a transformer comprising a first primary winding magnetically coupled to a secondary winding; a first series resonant impedance comprising a first resonant inductor, a first resonant capacitor, and the first primary winding connected in series; a first switching network connected between a first AC power node and a second AC power node, the first switching network comprising a first bi-directional switch connected in series with a second bi-directional switch, wherein the first series resonant impedance is connected in parallel with the second bi-directional switch; and a rectifier switch connected between a first end of the secondary winding and a first DC node, wherein a second end of the secondary winding is connected to a second DC node, and wherein the first bi-directional switch comprises a first switching device connected in series with a second switching device wherein a source of the first switching device is connected to a source of the second switching device, wherein the second bi-directional switch comprises a third switching device connected in series with a fourth switching device wherein a source of the third switching device is connected to a source of the fourth switching device; wherein a second series resonant impedance is connected in parallel with a fifth switching device, and wherein a predetermined voltage threshold to activate the first switching network is greater than a DC output voltage times the turn ratio between the first primary winding and the secondary winding.

2. The apparatus according to claim 1, further comprising:

an AC voltage connected across the first AC power node and the second AC power node, wherein, when a magnitude of the AC voltage is greater than a predetermined voltage threshold, the fifth switching device and a sixth switching device are turned off and the first bidirectional switch and the second bidirectional switch are operated to transfer power from the AC voltage to the first DC node and the second DC node, and when the magnitude of the AC voltage is not greater than the predetermined voltage threshold, the first bidirectional switch and the second bidirectional switch are turned off, and the fifth switching device and the sixth switching device are operated to transfer power from the AC voltage to the first DC node and the second DC node.

3. The apparatus according to claim 1, wherein the first DC node is the positive DC node and the second DC node is the negative DC node.

4. The apparatus according to claim 1, wherein the first DC node is the negative DC node and the second DC node is the positive DC node.

5. The apparatus according to claim 1, further comprising:

a bus capacitor connected in parallel with a second switching network.

6. The apparatus according to claim 1, further comprising:

an output capacitor connected across the first DC node and the second DC node.

7. An apparatus, comprising: a transformer comprising a first primary winding magnetically coupled to a secondary winding; a first series resonant impedance comprising a first resonant inductor, a first resonant capacitor, and the first primary winding connected in series; a first switching network connected between a first AC power node and a second AC power node, the first switching network comprising a first bi-directional switch connected in series with a second bi-directional switch, wherein the first series resonant impedance is connected in parallel with the second bi-directional switch; a rectifier switch connected between a first end of the secondary winding and a first DC node; and a bus capacitor connected in parallel with a second switching network, wherein a second end of the secondary winding is connected to a second DC node, and wherein the first bi-directional switch comprises a first switching device connected in series with a second switching device wherein a source of the first switching device is connected to a source of the second switching device, and wherein the second bi-directional switch comprises a third switching device connected in series with a fourth switching device wherein a source of the third switching device is connected to a source of the fourth switching device, and wherein a predetermined voltage threshold to activate the first switching network is greater than a DC output voltage times the turn ratio between the first primary winding and the secondary winding.

8. The apparatus according to claim 7, further comprising: a second primary winding magnetically coupled to the secondary winding; a second series resonant impedance comprising a second resonant inductor, a second resonant capacitor, and the second primary winding connected in series; a diode bridge connected between the first AC power node and the second AC power node and configured to produce a first DC power; and the second switching network connected in parallel with the first DC power, the second switching network comprising a fifth switching device connected in series with a sixth switching device, wherein the second series resonant impedance is connected in parallel with the sixth switching device.

9. The apparatus according to claim 7, further comprising:

an output capacitor connected across the first DC node and the second DC node.

10. An apparatus, comprising:

a transformer comprising a first primary winding magnetically coupled to a secondary winding;

a first series resonant impedance comprising a first resonant inductor, a first resonant capacitor, and the first primary winding connected in series;

a first switching network connected between a first AC power node and a second AC power node, the first switching network comprising a first bi-directional switch connected in series with a second bi-directional switch, wherein the first series resonant impedance is connected in parallel with the second bi-directional switch; and a rectifier switch connected between a first end of the secondary winding and a first DC node, an AC voltage connected across the first AC power node and the second AC power node, wherein a second end of the secondary winding is connected to a second DC node, and wherein the first bi-directional switch comprises a first switching device connected in series with a second switching device wherein a source of the first switching device is connected to a source of the second switching device, wherein the second bi-directional switch comprises a third switching device connected in series with a fourth switching device wherein a source of the third switching device is connected to a source of the fourth switching device, wherein, when a magnitude of the AC voltage is greater than a predetermined voltage threshold, a fifth switching device and a sixth switching device are turned off and the first bidirectional switch and the second bidirectional switch are operated to transfer power from the AC voltage to the first DC node and the second DC node, and when the magnitude of the AC voltage is not greater than the predetermined voltage threshold, the first bidirectional switch and the second bidirectional switch are turned off, and the fifth switching device and the sixth switching device are operated to transfer power from the AC voltage to the first DC node and the second DC node.

11. The apparatus according to claim 10, further comprising:

a second primary winding magnetically coupled to the secondary winding;

a second series resonant impedance comprising a second resonant inductor, a second resonant capacitor, and the second primary winding connected in series;

a diode bridge connected between the first AC power node and the second AC power node and configured to produce a first DC power; and a second switching network connected in parallel with the first DC power, the second switching network comprising a fifth switching device connected in series with a sixth switching device, wherein the second series resonant impedance is connected in parallel with the sixth switching device.

12. The apparatus according to claim 10, wherein the predetermined voltage threshold is greater than a DC output voltage times the turn ratio between the first primary winding and the secondary winding.

13. The apparatus according to claim 10, further comprising:

an output capacitor connected across the first DC node and the second DC node.

* * * * *